United States Patent
Caron et al.

(10) Patent No.: US 11,126,874 B2
(45) Date of Patent: Sep. 21, 2021

(54) METHOD FOR DETECTING FALSE POSITIVES RELATING TO A TRAFFIC LIGHT

(71) Applicants: Continental Automotive France, Toulouse (FR); Continental Automotive GmbH, Hannover (DE)

(72) Inventors: Thibault Caron, Toulouse (FR); Sophie Rony, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 16/483,073

(22) PCT Filed: Feb. 1, 2018

(86) PCT No.: PCT/FR2018/050241
§ 371 (c)(1),
(2) Date: Aug. 2, 2019

(87) PCT Pub. No.: WO2018/146400
PCT Pub. Date: Aug. 16, 2018

(65) Prior Publication Data
US 2020/0012870 A1     Jan. 9, 2020

(30) Foreign Application Priority Data
Feb. 10, 2017  (FR) .................... 1751127

(51) Int. Cl.
*G06K 9/00* (2006.01)
*G06T 7/73* (2017.01)

(52) U.S. Cl.
CPC ............ *G06K 9/00825* (2013.01); *G06T 7/73* (2017.01); *B60Q 2300/45* (2013.01); *G06T 2207/30236* (2013.01)

(58) Field of Classification Search
CPC .......... B60Q 2300/45; G06K 9/00791; G06K 9/00798; G06K 9/00805; G06K 9/00818;
(Continued)

(56) References Cited

U.S. PATENT DOCUMENTS

| 7,495,579 | B2 * | 2/2009 | Sirota .................... G08G 1/095 |
| | | | 246/473 R |
| 10,699,142 | B2 * | 6/2020 | Wisniowski ..... G08G 1/096725 |

(Continued)

FOREIGN PATENT DOCUMENTS

| JP | 2000353292 A | * 12/2000 | ............... G08G 1/07 |
| JP | 2005301519 A | * 10/2005 | ............... G08G 1/16 |

(Continued)

OTHER PUBLICATIONS

Jianwei Gong, et al. ("The Recognition and Tracking of Traffic Lights Based on Color Segmentation and CAMSHIFT for Intelligent Vehicles") 2010 IEEE Intelligent Vehicles Symposium, Jun. 21, 2010, 978-1-4244-7868-2/10 © 2012 IEEE, p. 431-435 (Year: 2012).*

(Continued)

*Primary Examiner* — Stephen R Burgdorf
(74) *Attorney, Agent, or Firm* — RatnerPrestia

(57) ABSTRACT

A method for detecting false positives relating to a traffic light based on a video stream of images captured by a camera on board a motor vehicle, the traffic light being configured so as to switch between a plurality of states, each state being characterized by at least one colored zone representative of a signal. The method includes filtering the images, using a predetermined list of filtering criteria relating to the states of the traffic light, based on a predetermined history of the color of the pixels of the colored zone representing a luminous object detected in the video stream of images so as to detect false positives.

5 Claims, 1 Drawing Sheet

(58) Field of Classification Search
CPC .... G06K 9/00825; G06K 9/2018; G06T 5/50; G06T 7/73; G06T 2207/30236; G08B 13/1968; G08G 1/00; G09G 3/3413; H04N 9/643; H04N 9/735
USPC .......................................................... 340/931
See application file for complete search history.

(56) References Cited

U.S. PATENT DOCUMENTS

| | | | |
|---|---|---|---|
| 2005/0275718 | A1 | 12/2005 | Lai et al. |
| 2007/0047809 | A1 | 3/2007 | Sasaki |
| 2010/0172542 | A1* | 7/2010 | Stein ...................... G06K 9/209 382/103 |
| 2013/0211682 | A1* | 8/2013 | Joshi ...................... B60R 11/04 701/70 |
| 2015/0179088 | A1* | 6/2015 | Raman ............... G06K 9/00825 348/62 |
| 2015/0210274 | A1* | 7/2015 | Clarke .................. B60K 31/00 382/104 |
| 2015/0234045 | A1* | 8/2015 | Rosenblum ............ G01S 13/86 342/71 |
| 2016/0070965 | A1* | 3/2016 | Nelson ..................... G06K 9/46 382/104 |
| 2016/0328629 | A1* | 11/2016 | Sinclair .................. G06T 7/254 |
| 2017/0043717 | A1* | 2/2017 | Heiman ........... G08G 1/096716 |
| 2017/0084172 | A1* | 3/2017 | Rolle .................... G08G 1/0116 |
| 2017/0228606 | A1* | 8/2017 | Guan ........................ G06T 7/90 |
| 2018/0053059 | A1* | 2/2018 | Mei .................... G06K 9/00818 |
| 2019/0333381 | A1* | 10/2019 | Shalev-Shwartz ... G05D 1/0253 |

FOREIGN PATENT DOCUMENTS

| | | | | |
|---|---|---|---|---|
| JP | 2007060273 | A | | 3/2007 |
| JP | 2010173597 | A | | 8/2010 |
| JP | 2012003543 | A | * | 1/2012 ............... G08G 1/00 |
| JP | 2014232431 | A | | 12/2014 |
| JP | 2015170240 | A | | 9/2015 |

OTHER PUBLICATIONS

Youn Kim et al. ("Real Time Traffic Light Recognition System for Color Vision Deficiencies") Proceedings of the 2007 IEEE, International Conference on Mechatronics and Automation, Aug. 5, 2007, 1-4244-0828-8/07 © 2007 IEEE, p. 76-81. (Year: 2007).*

Akhan Almagambetov ("Mobile Standards-Based Traffic Light Detection in Assistive Devices for Individuals with Color-Vision Deficiency") IEEE Transactions on Intelligent Transportation Systems, vol. 16, No. 2, Jun. 2015, 1524-9050 © 2014 IEEE, pp. 1305-1320. (Year: 2014).*

Moises Diaz-Cabrera et al. ("Robust Real-time Traffic Light Detection and Distance Estimation Using a Single Camera") www.elsevier.com/locate/news, Expert Systems with Applications 42, Dec. 30, 2014, 0957-4174 © 2015 Elsiever Ltd., pp. 3911-3923. (Year: 2015).*

Chulhoon Jang ("Multiple Exposure Images based Traffic Light Recognition") 2014 IEEE Intelligent Vehicles Symposium (IV), Jun. 8, 2014, 978-1-4799-3637-3/14 © 2014 IEEE, pp. 1313-1318. (Year: 2014).*

Jian-Gang Wang, et al. ("Real-time Vehicle Signal Lights Recognition with HDR Camera") 2016 IEEE International Conference on Internet of Things (iThings), 978-1-5090-5880-8/16 © 2016 IEEE, pp. 355-358. (Year: 2016).*

Moises Diaz-Cabrera et al. ("Suspended Traffic Lights Detection and Distance Estimation Using Color Features") 2012 15th International IEEE Conference on Intelligent Transportation Systems, Sep. 16, 2012, 978-1-4673-3063-3/12 © 2012 IEEE, p. 1315-1320. (Year: 2012).*

Zixing Cai et al. ("Real-time Recognition System of Traffic Light in Urban Environment") School of Information Science and Engineering, Central South University Changsha, Hunan Province, China, 978-1-4673-1417-6/12 © 2012 IEEE, pp. 1-6. (Year: 2012).*

International Search Report and Written Opinion for International Application No. PCT/FR2018/050241, dated May 24, 2018—6 pages.

* cited by examiner

METHOD FOR DETECTING FALSE POSITIVES RELATING TO A TRAFFIC LIGHT

CROSS REFERENCE TO RELATED APPLICATIONS

This application is the U.S. National Phase application of PCT International Application No. PCT/FR2018/050241, filed Feb. 1, 2018, which claims priority to French Patent Application No. 1751127, filed Feb. 10, 2017, the contents of such applications being incorporated by reference herein.

FIELD OF THE INVENTION

The invention pertains to the field of motor vehicle driving assistance, and relates more precisely to a method for detecting false positives relating to a traffic light, based on a video stream of images captured by a camera on board a motor vehicle.

The invention makes it possible to reduce the number of false detections of a traffic light, so as to allow better assistance for the driver.

BACKGROUND OF THE INVENTION

Motor vehicles nowadays use, as is known, driving assistance systems in order to assist the driver with his maneuvers, thus making driving easier and safer.

Such a driving assistance system uses a camera, for example installed in the upper part of the windshield, which films in front of the vehicle and supplies the images to a computer, which utilizes them.

One known function of such a driving assistance system consists in detecting traffic lights, in particular in order to inform the driver when a traffic light is red and thus to allow him to stop the vehicle.

This function is performed, as is known, using an image processing algorithm. Such an algorithm may generate several types of detection error: for example, either a traffic light is not detected, or an incorrect color of the light is detected, or a detection occurs even though there is no traffic light present in the field of the camera of the vehicle, this last type of error then being called "false positive".

To avoid inappropriately warning the driver about a non-existent light, it is therefore necessary to reduce the number of false positives as much as possible.

In one existing solution, the image processing for detecting traffic lights consists in segmenting the images so as to detect luminous zones, in tracking these zones throughout the images and in classifying the images so as to detect traffic lights and to eliminate false positives. The segmentation consists in dividing the image into regions that may be of different sizes, in which each region is homogeneous depending on the color of the pixels. The segmentation thus makes it possible to identify the luminous zones present in the images, in particular those that may correspond to a traffic light. The tracking consists in associating, from one image to the next, the detected regions corresponding to one and the same luminous object. The classification consists in, for each luminous zone identified in an image, launching an automatic learning algorithm trained beforehand to recognize whether or not a region contains a traffic light.

This solution does not however make it possible to eliminate enough false positives, thereby possibly leading to incorrect operation of the driving assistance system and constituting a risk for the safety of the occupants of the vehicle.

SUMMARY OF THE INVENTION

There is therefore the need for a solution allowing more false positives to be eliminated during the detection of traffic lights, and more generally of any object that it is desired to detect in the field of the camera so as to improve vehicle driving assistance.

To this end, an aspect of the present invention relates first of all to a method for detecting false positives relating to a traffic light based on a video stream of images captured by a camera on board a motor vehicle, said traffic light being configured so as to switch between a plurality of states, each state being characterized by at least one colored zone representative of a signal.

The method is noteworthy in that it comprises a step of filtering the images, using a predetermined list of filtering criteria relating to the states of the traffic light, based on a predetermined history of the color of the pixels of the colored zone representing a luminous object detected in the video stream of images so as to detect false positives.

The method according to an aspect of the invention may advantageously be applied to images having undergone classification using a method from the prior art. Given that the classification is performed image by image, it does not take into account the history of the images, and in particular the evolution of the colors of the detected luminous objects. The use of filtering criteria based on the history of the images, in particular the detected colored zones, thus makes it possible to eliminate incorrect detections quickly and effectively. More precisely, based on the evolution of the color sequences detected in the images, the method according to an aspect of the invention makes it possible to reduce the number of false detections with regard to the presence and/or the state of a traffic light so as to allow effective assistance for the driver.

The method preferably comprises a preliminary step of detecting a luminous object in the video stream of images.

Again preferably, the method comprises a preliminary step of determining the history of the color of the pixels of the colored zone representing a luminous object detected in the video stream of images.

Advantageously, determining the history comprises, for each successive image of the video stream of images, determining and storing the color (hue) of the pixels of the colored zone representing a luminous object detected in said image.

Preferably, determining the color of the pixels of the colored zone representing a detected luminous object comprises smoothing the color over time. This smoothing makes it possible to limit noise in the detection of the color.

Advantageously, the color is smoothed based on a predetermined number of images preceding said image in the video stream of images. This makes it possible to determine the most probable color of a traffic light based on the history of the colors detected for this light.

The image is preferably smoothed based on at least the previous 10 images so as to have a satisfactory probability.

Again preferably, at least one of the criteria relates to determining a sequence relating to a green or red state of the luminous object.

Advantageously, one of the criteria relates to the duration of an amber or amber-and-red state of the luminous object, the filtering regarding said criterion consisting in verifying whether an amber or amber-and-red state of the luminous object is active for a duration greater than a first predetermined threshold.

Advantageously, one of the criteria relates to the persistence of the red color over a travel distance of the vehicle greater than a predetermined distance.

Advantageously, one of the criteria relates to the transition between the green color and the red color of the luminous object, the filtering regarding said criterion consisting in verifying that the green color appears for a sequence of a number of images greater than a first predetermined threshold, and then that the red color appears for a sequence of a number of images greater than a second predetermined threshold.

Advantageously, one of the criteria relates to the observation of a luminous object flashing from red to red-and-amber.

Advantageously, one of the criteria relates to the duration of a green state of the luminous object, the filtering consisting in verifying whether a green state of the luminous object is active for a duration less than a second predetermined threshold.

Advantageously, one of the criteria relates to the repetition of color sequences corresponding to the green color alternating with other states.

An aspect of the invention also relates to a motor vehicle comprising a camera, configured so as to capture a video stream of images representing the surroundings of the vehicle, and a computer configured so as to utilize said video stream of images so as to detect a traffic light, said traffic light being configured so as to switch between a plurality of states, each state being characterized by at least one colored zone representative of a signal.

The vehicle is noteworthy in that the computer is configured so as to filter the images, using a predetermined list of filtering criteria relating to the states of the traffic light, based on a predetermined history of the color of the pixels of the colored zone representing a luminous object detected in the video stream of images so as to detect false positives.

The computer is preferably configured so as to determine and store, for each successive image of the video stream of images, the color of the pixels of the colored zone representing a luminous object detected in said image.

Again preferably, the computer is configured so as to smooth said color before filtering.

BRIEF DESCRIPTION OF THE DRAWINGS

Other features and advantages of aspects of the invention will emerge during the following description, given with reference to the appended figures, which are given by way of nonlimiting example and in which identical references are given to similar objects.

DETAILED DESCRIPTION OF THE PREFERRED EMBODIMENTS

Figure 1:
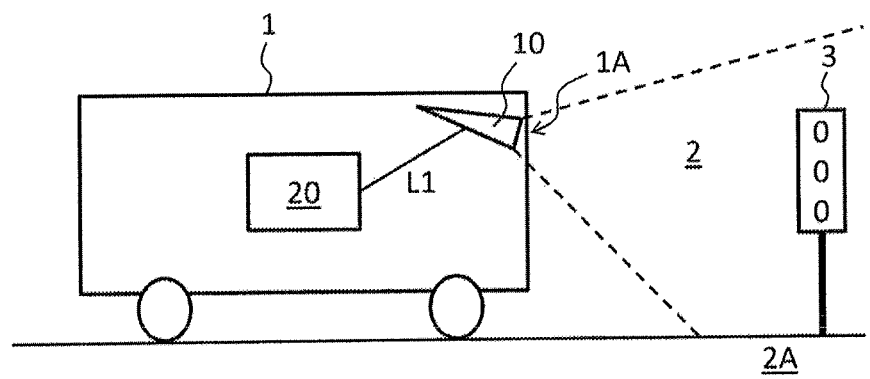
FIG. 1 schematically illustrates one embodiment of a motor vehicle according to an aspect of the invention.

FIG. 1 schematically shows a motor vehicle according to an aspect of the invention. The vehicle 1 comprises an on-board video camera 10 and an on-board computer 20 linked to said camera 10 by a communication link L1.

The camera 10 is preferably installed on the upper part of the front windshield 1A of the vehicle 1. The camera is configured so as to capture a video stream of images representing the surroundings of the vehicle 1 and to supply it to the computer 20.

The computer 20 is configured so as to utilize the video stream of images delivered by the camera 10 so as to detect traffic lights 3 situated in the field 2 of the camera 10.

Each traffic light 3 is configured so as to switch between a plurality of states, each state being characterized by at least one colored zone representative of a signal. For example, a three-color traffic light 3 is configured so as to switch successively between a green state, an amber state and a red state, or even an amber-and-red state, in order to control vehicle traffic. For example again, a flashing traffic light 3 will alternate between an amber state and an off state.

An aspect of the invention will be described below with reference to these types of traffic light 3, but it will be noted that it applies, mutatis mutandis, to any other type of traffic light.

The computer 20 is configured so as to determine, for each image in which a luminous object has been detected, the color of the pixels representing the colored zone corresponding to the detected luminous object (or the colored zones in the case of a multicolor object, for example amber-and-red).

In this preferred example, the computer 20 is configured so as to smooth said color based on its color history determined in the images preceding the current image, for example the last 10 images.

This smoothing consists in defining the most probable color of the pixels representing the detected luminous object based on the detection history of the color for this object. It takes into account the performance of the algorithm for detecting the color. For example, the amber color may be more difficult to detect correctly than green and red. Thus, the conditions for considering the amber color to be the most probable may be more flexible than for the red and green colors. This smoothing is performed by tracking the luminous object throughout the images.

The computer 20 is also configured so as to store the color value or values (that is to say the hue) determined for each image in a memory zone (not shown) so as to create a history representing the evolution of the color of the colored zone over time. The color history is thus constructed throughout the successive images in which a luminous object has been detected.

The computer 20 is also configured so as to filter the images based on the history and using a predetermined list of filtering criteria relating to the states of the traffic light 3 so as to detect false positives, as will be described hereinafter.

Figure 2:
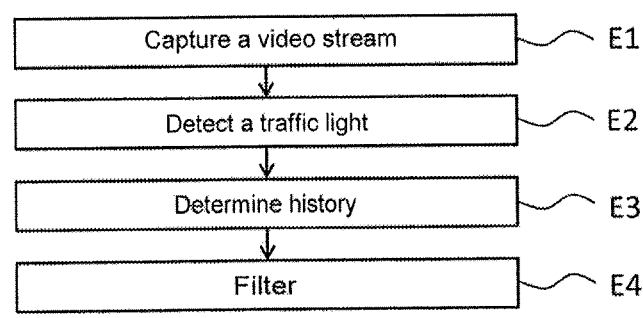
FIG. 2 schematically illustrates one embodiment of the method according to an aspect of the invention.

An aspect of the invention will now be described in terms of the implementation thereof with reference to FIG. 2.

First of all, in a step E1, the camera 10 captures a video stream of images, for example when the vehicle 1 is traveling on a road 2A.

This stream of images is sent in real time to the computer 20, which utilizes it so as to detect, in a step E2, any traffic light 3 situated in the field 2 of the camera, and which would therefore appear in the captured images.

In one embodiment, this detection may be performed by segmenting the captured images, by tracking the luminous object detected in the segmented images and by applying a classification algorithm thereto.

Generally speaking, the segmentation consists in dividing the image into regions, in which each region is homogeneous within the meaning of a given criterion, for example shape, color, texture, etc. In this case, a traffic light 3 is detected by grouping the pixels together by color, a luminous region of pixels corresponding to a luminous object, which may in particular be a traffic light 3.

The tracking consists in associating, from one image to another, the detected regions corresponding to one and the same object.

The classification consists, for each segmented region, in launching an automatic learning algorithm trained to recognize whether or not a region contains a traffic light. This automatic learning algorithm is preferably trained beforehand, for example before the vehicle is sold or during maintenance. To detect traffic lights 3, the classification may be improved by real-time learning performed throughout the images so as to improve the accuracy of the classes (or even create new classes) and detect more false positives.

When a traffic light 3 has been detected, the computer 20 constructs, based on a plurality of successive images, a history representing the evolution of the color of the colored zone over time (step E3).

To this end, the computer 20 determines, for each image in which a traffic light 3 has been detected, the color of the pixels representing the colored zone of the detected traffic light 3 (or the colored zones in the case for example of an amber-and-red light), and then stores this color value in a memory zone of the computer 20 so as to create the history. The color history is thus constructed throughout the successive images in which a luminous object has been detected.

In one preferred embodiment, the colors are stored in the history in the form of color sequences. For example, if the detected object has been red for twenty images and was previously green for thirty-five images, the history contains two color sequences: the current red sequence that has lasted for twenty images and for example twenty-five meters covered by the vehicle 1, and the preceding green sequence that lasted thirty-five images acquired over 100 m covered by the vehicle 1.

Determining the color preferably comprises preliminary smoothing based on the color of the pixels representing the luminous object in the images preceding the current image, for example the last ten images.

Once the history has been constructed or updated, the computer 20, in a step E4, filters the images based on the data from the history and using a predetermined list of filtering criteria relating to the states of the traffic light 3 so as to detect false positives.

This filtering is performed continuously and makes it possible to observe the variation of the color of the luminous object detected in the images through color sequences (green, amber/amber-and-red, red).

The filtering is performed based on a predetermined list of filtering criteria applied to the history of color sequences of the detected object.

One preferred example of a list of filtering criteria will now be given below with reference to a three-color traffic light 3 (green, amber, red). In this example, six filtering criteria are used. These criteria relate in particular to the duration and the persistence of the green and red colors. These criteria are preferably applied successively in the following order.

First of all, the first criterion relates to the duration of an amber or amber-and-red state of the light. The filtering in this case consists in verifying whether an amber or amber-and-red state of the light is active for a duration greater than a first predetermined threshold, for example 10 seconds. If the threshold is exceeded, it is considered that the detected lights do not correspond to a state of a traffic light, the amber or amber-and-red state being temporary (changing to the green light or to the red light or else a flashing light). In this case, the detections, which may correspond for example to a streetlight, are considered to be a false positive and are not utilized for driving assistance.

The second criterion relates to the persistence of the red color. When the traffic light 3 has remained red while the vehicle 1 has covered a predetermined distance, for example 200 meters, it is considered that the detected object is a false positive (probably the tail light of another vehicle being followed over a long distance), as it is considered that the computer 20 is not able to detect a traffic light 3 at a distance greater than the predetermined distance. It will be noted here that the distance covered by the vehicle 1 is an item of data that is easily able to be collected by the computer 20 and that is able to be stored in the memory zone of the computer 20 for each color sequence of the history (for example, a green color sequence detected in fifty images captured while the vehicle 1 covered twenty meters).

The third criterion relates to the transition between the green color and the red color. In this case, when the green color appears for a sequence of a number of images greater than a first predetermined threshold, for example ten images, and then the red color appears for a sequence of a number of images greater than a second predetermined threshold, for example five images, it is considered that a transition between green and red has been proven, thereby indicating the presence of a false positive, since such a transition does not actually exist (amber is always in between).

The fourth criterion relates to the observation of a light flashing from red to red-and-amber. Thus, when an alternation of red and red-and-amber sequences is observed, it is deduced therefrom that the light is flashing red or red-and-amber and corresponds to a flashing red (brake) or amber (direction indicator) light of another vehicle (assuming for example that the red light of the automobile remains turned on and that the amber light flashes). It is then considered in this case that a false positive is present.

The fifth criterion relates to the duration of a green state of the light. The filtering in this case consists in verifying whether a green state of the light is active for a duration less than a second predetermined threshold, for example ten seconds. Thus, if a sequence of images is detected in which the light is green for a short period, it is considered that the detected light does not correspond to a state of the traffic light, and that a false positive is present.

Lastly, the sixth criterion relates to the repetition of sequences corresponding to the green color alternating with other colors (for example green-red-green). In this case, it is again considered that the detected object is a false positive.

The method may preferably comprise tracking the luminous object after it has been detected as being a false positive so as to cancel this detection if the color of the object no longer meets the filtering criteria in the list, and thus avoid cases of incorrect false positive detection.

The method according to an aspect of the invention makes it possible to detect false positives quickly and reliably by applying a succession of criteria to the color sequences relating to a luminous object detected in the images, these color sequences being determined based on a plurality of successive images. The criteria that are used thus make it possible to indicate a similarity between a detected luminous object and a traffic light, in particular according to its operation.

The invention claimed is:

1. A method for detecting false positives relating to a traffic light configured to switch between a plurality of states, each state being characterized by at least one color, said method comprising:
   capturing, by a camera onboard a vehicle, a video stream of images;
   processing, by a processor, the video stream of images to determine a color classification of a luminous object in each of a plurality of the images;
   storing, by the processor, the color classifications of the luminous object for each of the plurality of images as a history of the color classifications over time; and
   filtering, by the processor, the plurality of the images, by:
      determining, based on the history of the color classifications over time, a color duration timing of the luminous object and a color sequence for the luminous object,
      comparing the color duration timing of the luminous object to a predetermined color duration timing of the traffic light,
      comparing the color sequence for the luminous object to a predetermined color sequence of three or more colors for the traffic light,
      when the comparison of the color duration timing indicates that the color duration timing of the luminous object does not correspond to the predetermined color duration timing of the traffic light, determine that the luminous object is a false positive and avoid use of the luminous object as the traffic light in a driver assistance system of the vehicle, and
      when the comparison of the color sequence indicates that the color sequence of the luminous object does not correspond to the predetermined color sequence of the three or more colors of the traffic light, determine that the luminous object is the false positive and avoid use of the luminous object as the traffic light in the driver assistance system of the vehicle,
   wherein the processor performs the filtering according to at least one of:
      a criterion relating to determining a color sequence relating to a green or red state of the luminous object,
      a criterion relating to the duration of an amber or amber-and-red state of the luminous object, the filtering consisting in verifying whether an amber or amber-and-red state of the luminous object is active for a duration greater than a first predetermined threshold,
      a criterion relating to the persistence of the red color over a travel distance of the vehicle greater than a predetermined distance,
      a criterion relating to the transition between the green color and the red color of the luminous object, the filtering consisting in verifying that the green color appears for a sequence of a number of images greater than a first predetermined threshold, and then that the red color appears for a sequence of a number of images greater than a second predetermined threshold,
      a criterion relating to the observation of a luminous object flashing from red to red-and-amber,
      a criterion relating to the duration of a green state of the luminous object, the filtering consisting in verifying whether a green state of the luminous object is active for a duration less than a second predetermined threshold, and
      a criterion relating to the repetition of color sequences corresponding to the green color alternating with other states.

2. A method for detecting false positives relating to a traffic light configured to switch between a plurality of states, each state being characterized by at least one color, said method comprising:
   capturing, by a camera onboard a vehicle, a video stream of images;
   processing, by a processor, the video stream of images to determine a color classification of a luminous object in each of a plurality of the images;
   storing, by the processor, the color classifications of the luminous object for each of the plurality of images as a history of the color classifications over time; and
   filtering, by the processor, the plurality of the images, by:
      determining, based on the history of the color classifications over time, a color duration timing of the luminous object and a color sequence for the luminous object,
      comparing the color duration timing of the luminous object to a predetermined color duration timing of the traffic light,
      comparing the color sequence for the luminous object to a predetermined color sequence of three or more colors for the traffic light,
      when the comparison of the color duration timing indicates that the color duration timing of the luminous object does not correspond to the predetermined color duration timing of the traffic light, determine that the luminous object is a false positive and avoid use of the luminous object as the traffic light in a driver assistance system of the vehicle, and
      when the comparison of the color sequence indicates that the color sequence of the luminous object does not correspond to the predetermined color sequence of the three or more colors the traffic light, determine that the luminous object is the false positive and avoid use of the luminous object as the traffic light in the driver assistance system of the vehicle,
   wherein the filtering comprises smoothing the color over time.

3. The method as claimed in claim 2, wherein the color is smoothed based on a predetermined number of the images.

4. The method as claimed in claim 3, wherein the predetermined number of images includes at least ten images.

5. A vehicle comprising:
   a camera onboard the vehicle, configured to capture a video stream of images representing the surroundings of the vehicle; and
   a computer configured to:
      process said video stream of images to determine a color classification of a luminous object in each of a plurality of the images,
      store the color classifications of the luminous object for each of the plurality of images as a history of the color classifications over time, and
      filter the plurality of images, by:
         determining, based on the history of the color classifications over time, a color duration timing of the luminous object and a color sequence for the luminous object,
         comparing the color duration timing of the luminous object to a predetermined color duration timing of the traffic light, comparing the color sequence for the luminous object to a predetermined color sequence of three or more colors for the traffic light, when the comparison of the color duration timing indicates that the color duration timing of the luminous object does not correspond to the predetermined color duration timing of the traffic light, determine that the luminous object is a false positive and avoid use of the luminous object as the traffic light in a driver assistance system of the vehicle, and when the comparison of the color sequence indicates that the color sequence of the luminous object does not correspond to the predetermined color sequence of the three or more colors the traffic light, determine that the luminous object is the false positive and avoid use of the luminous object as the traffic light in the driver assistance system of the vehicle, wherein the computer performs the filtering according to at least one of:
- a criterion relating to determining a color sequence relating to a green or red state of the luminous object,
- a criterion relating to the duration of an amber or amber-and-red state of the luminous object, the filtering consisting in verifying whether an amber or amber-and-red state of the luminous object is active for a duration greater than a first predetermined threshold,
- a criterion relating to the persistence of the red color over a travel distance of the vehicle greater than a predetermined distance,
- a criterion relating to the transition between the green color and the red color of the luminous object, the filtering consisting in verifying that the green color appears for a sequence of a number of images greater than a first predetermined threshold, and then that the red color appears for a sequence of a number of images greater than a second predetermined threshold,
- a criterion relating to the observation of a luminous object flashing from red to red-and-amber,
- a criterion relating to the duration of a green state of the luminous object, the filtering consisting in verifying whether a green state of the luminous object is active for a duration less than a second predetermined threshold, and
- a criterion relating to the repetition of color sequences corresponding to the green color alternating with other states.

\* \* \* \* \*